Patented May 27, 1952

2,598,406

UNITED STATES PATENT OFFICE 2,598,406

METHYLOL PHENOL ESTERS AND PLASTICIZED MATERIALS THEREFROM

Robert W. Martin, Lenox, Mass., assignor to General Electric Company, a corporation of New York No Drawing. Application January 4, 1951,
Serial No. 204,464

16 Claims. (Cl. 106—179)

This application is a continuation-in-part of my earlier filed application, Serial No. 122,128 filed October 18, 1949, now U. S. Patent 2,579,329 issued December 18, 1951, and assigned to the same assignee as the present invention.

This invention relates to methylol phenyl esters corresponding to the general formula:

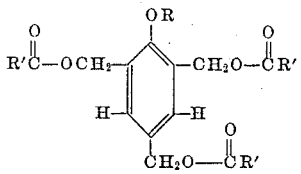

where R represents a member of the class consisting of aliphatic, cycloaliphatic, aryl-substituted aliphatic groups as well as halogen-substituted derivatives of the aforementioned aliphatic, e. g., alkyl, halogenated, alkyl group, cycloaliphatic, and aryl-substituted aliphatic groups, and R' represents a member of the class consisting of aliphatic, cycloaliphatic, aryl, aliphatic-substituted aryl, and aryl-substituted aliphatic groups, including the nuclearly halogen-substituted derivatives of the aforesaid aryl and aryl-substituted groups (e. g., aliphatic-substituted aryl and aryl-substituted aliphatic). The invention also includes mixtures of the above-identified chemical compounds in which the latter comprise preferably though not essentially a major proportion of mixtures which also contain compounds corresponding to the general formula:

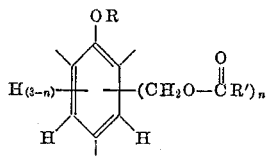

where R and R' have the meanings given above and n is an integer equal to from 1 to 2, inclusive. Resinous compositions such as, for example, cellulose esters, polyvinyl chloride, polyvinyl halides; copolymers of vinyl halides and vinyl esters, e. g., vinyl acetate, vinyl propionate, etc.; polyvinyl acetals, for example, polyvinyl formals, polyvinyl butyrals, etc., modified by the above-described methylol phenol esters are also included within the scope of the invention.

Among the organic group, which R in the above formula may represent, are, for instance, alkyl groups, e. g., methyl, ethyl, propyl, isopropyl, butyl, amyl, etc.; unsaturated aliphatic, e. g., vinyl, allyl, methallyl, cyclopentenyl, cyclohexenyl, crotonyl, etc.; cyclopentanyl, etc.; aralkyl, for instance, benzyl, phenylethyl, etc.; styryl, etc.; as well as halogenated derivatives of the aforementioned aliphatic groups, for example, the aforementioned groups containing chlorine, bromine, fluorine, or iodine, either on the aliphatic or aromatic (i. e., nuclearly-substituted) grouping and either monohalogenated or polyhalogenated, for example, containing from two or more halogens, for example, chlorines, bromines, fluorines, etc., in the organic group.

R' in addition to representing the non-halogenated groupings recited for R may also comprise aliphatic-substituted aryl groups, for example, tolyl, xylyl, ethyl-phenyl, etc., group; aryl, for example, phenyl, naphthyl, biphenyl, etc.; as well as the nuclearly halogen-substituted aryl derivatives (e. g., chlorophenyl, 2,4-chlorobenzyl, 2-methyl-4-bromophenyl, etc.) of the groups mentioned above, such halogen-substituted derivatives being more particularly described in connection with many of the compounds recited for the symbol R.

The claimed methylol phenyl esters may be prepared by a variety of methods. They may be prepared from compounds corresponding to the general formula:

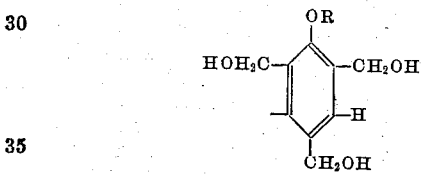

where R has the meaning given above. Such methylol phenyl ethers are disclosed in my application Serial No. 122,128. The ethers therein described are in turn prepared from either the sodium salt or barium salt of trimethylol phenol, said salts also being disclosed and claimed in my aforesaid application Serial No. 122,128.

In order to prepare the claimed methylol phenyl esters, the required methylol phenyl ether is caused to react wtih an organic acid chloride or anhydride whose ester it is desired to produce. Organic acids in conjuncttion with organic acid anhydrides having boiling points below the acid may also be used. Among such acids which may be used in the preparation of the methylol phenyl esters are, for example, butyric, isobutyric, crotonic, valeric, octanoic, acrylic, methacrylic, chloroacrylic, benzoic, naphthoic, toluic, phenylacetic, etc., acids. Obviously, as pointed out above, aromatic nuclearly halogenated derivatives of the acids may also be used in preparing the compositions of matter embraced by the instant claimed invention.

To understand how the present invention may be practiced, the following examples are given by way of illustration and not by way of limitation. All parts are by weight. The sodium or barium salt of trimethylol phenol was prepared as follows.

*Example I*

To 188 parts (2 mols) of phenol were added 90 parts (2.25 mols) of sodium hydroxide which had been previously dissolved in seventy parts by weight of water. The mixture was cooled and allowed to crystallize; 588 parts (7.3 mols) of formalin (37.2% by weight formaldehyde) were added and the mixture stirred. The temperature of the reaction mixture rose spontaneously to a maximum of 45° C. and then dropped slowly. The mixture was kept at room temperature fifteen to twenty hours, dehydrated under vacuum with heat until the temperature in the flask rose to 45° C. and poured into several times its volume of ethanol. After 3–4 hours the resultant precipitate was filtered and dried.

Theoretical yield_____ 412 parts by weight
Actual yield_____ 335 parts by weight
                            or 81.3% of theory Formalin in the amount of 140 parts (1.73 mols), forty-seven parts (0.5 mol) of phenol and forty-seven parts (0.55 equivalents) anhydrous barium hydroxide dissolved in seventy-five parts hot water were mixed in that order. The reaction mixture was kept at a temperature of 30° C. or lower for two hours. The mixture was allowed to react for twenty-four hours at room temperature. Ethanol in the amount of 1600 parts by weight was added with vigorous mechanical stirring. The resulting precipitate, after standing a few hours, was filtered off, washed with acetone and dried in a vacuum desiccator.

Theoretical yield_____ 125.8 parts by weight
Actual yield_____ 97.9 parts by weight
                          or 77.8% of theory The identity of the above-prepared sodium salt was established by making derivatives thereof and determining the characteristics of the derivatives in accordance with the procedures outlined in my earlier filed application Serial No. 122,128.

It will be noted that the reaction for making the sodium or barium salts may be carried out at various temperatures, the lower temperatures ranging at around 0° C. requiring a reaction time of several days while the reaction at temperatures around 60° C. takes place in several hours. However, temperatures of over 65° C. will cause undesirable side reaction.

The sodium and barium 2,4,6-tris(hydroxymethyl) phenates may be reacted with other compounds to provide a class of primary polyhydric alcohols with a wide range of applications in the chemical, plastics and coating arts. Notable among such compounds are the ethers formed by the etherification of the phenolic hydroxyl groups. Such etherification considerably retards the tendency of the tris(hydroxymethyl)-compound to resinify and hence makes it available for a number of other reactions and applications not possible with sodium tris(hydroxymethyl)phenol.

The ethers prepared from the sodium and barium 2,4,6-tris(hydroxymethyl)phenates may be represented by the general formula:

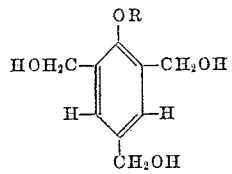

where R has the meaning given above and represents a member of the class consisting of aliphatic, cycloaliphatic and aryl-substituted aliphatic groups including their halogen-substituted derivatives. The following examples illustrate the preparation of these types of compounds.

*Example II*

A mixture of 139 parts by weight of sodium 2,4,6-tris(hydroxymethyl)phenate, 126 parts by weight of methyl iodide and 440 parts by weight of methanol was divided equally between three bottles. The bottles were sealed and placed in an oven at 65° C. for about fifteen to twenty hours. The bottles were cooled and opened. The methanol was boiled off and the products were dissolved in amyl alcohol. The amyl alcohol solution was washed with an aqueous solution of sodium carbonate. The amyl alcohol was distilled off under vacuum. The product, 1-methoxy-2,4,6-tris(hydroxymethyl)benzene was a viscous light brown syrup.

Yield=118 parts by weight
Theory=134 parts by weight
Methoxyl content=15.33%, 15.70%
Theory=15.66%

*Example III*

To twenty-one parts by weight of sodium 2,4,6-tris(hydroxymethyl)phenate placed in a bottle, eighty parts by weight of methanol and sixteen parts by volume of methyl iodide were added. The bottle was sealed and heated for six hours at 68° C. The reaction mixture was allowed to stand for two days at room temperature. The methanol was evaporated and the product esterified using acetic anhydride and pyridine as esterifying agent. The ester, 1-methoxy-2,4,6-tris-(acetoxymethyl)benzene, was distilled.

Saponification equivalent=107, 106.4
Theory=108
Carbon:
    Found=59.53%, 59.57%
    Theory=59.26%

Hydrogen:
    Found=5.96, 6.01
    Theory=6.22

*Example IV*

To 210 parts by weight of sodium 2,4,6-tris(hydroxymethyl)phenate was added a solution of 130 parts by weight of allyl bromide in 475 parts by weight of methanol. The mixture was refluxed with stirring for two hours. The methanol was distilled off under vacuum and amyl alcohol added. The amyl alcohol solution was washed with a solution of saturated sodium carbonate-potassium chloride and was dried over anhydrous sodium sulphate. The amyl alcohol was removed under vacuum. The product, 1-allyloxy-2,4,6-tris(hydroxymethyl)benzene, was a brown syrup.
Yield=140 parts by weight. Theory=224.

Example V

Same as Example IV except that the mixture was heated for two and one-half to three hours at 45° C. (and then at 60° C.) for two hours. For a number of reactions of this example the conversion to the allyl ether was found to range from 90 per cent to 100 per cent.

Example VI

Forty-two parts by weight of the sodium 2,4,6-tris(hydroxymethyl)phenate was placed in a bottle with forty parts by volume of a 2.5 per cent solution of sodium hydroxide. 26.6 parts by weight of benzyl chloride was added as well as thirty-two parts by weight of methanol. The reaction ingredients were shaken at 55° C. for forty-eight hours. The cooled contents of the bottle were poured into 200–300 parts by weight of hot water, heated for ten to fifteen minutes and stirred. When stirring was stopped, the product separated out as an oily layer. The washed product was dissolved in acetone, filtered, and the water and acetone distilled off. The product, 1-benzyloxy-2,4,6-tris(hydroxymethyl)benzene, was a brown syrup. The theoretical yield was 54.8 parts by weight, the actual yield was 38.92 parts by weight or a 71 per cent yield.

Example VII

Example VI was repeated using nineteen parts by weight of 2-methallyl chloride in place of the benzyl chloride. The methanol which had been added in Example VI to increase the solubility of the benzyl chloride in the reaction mixture was not employed. The product, 1-(2'-methallyloxy)-2,4,6-tris(hydroxymethyl)benzene, was a very viscous, almost solid brown syrup. The actual yield was 32.92 parts by weight as compared with the theoretical 47.6 parts by weight or a 69 per cent yield.

Example VIII

Example VI was again repeated using 23.3 parts by weight 2,3-dichloropropene-1 in lieu of the benzyl chloride. Methanol was not used. The product, 1-(2'-chloroallyloxy)-2,4,6-tris(hydroxymethyl)benzene was a viscous brown syrup. The yield of 44.52 parts by weight was 86 per cent of the theoretical value of 51.7 parts by weight.

Example IX

Example VI was repeated using 23.3 parts by weight of 1,3-dichloropropene-1 in place of benzyl chloride and without the use of methanol. The 1-(3'-chloroallyloxy)-2,4,6-tris(hydroxymethyl)benzene was a viscous brown syrup. The yield was 40.82 parts by weight or 79 per cent of the theoretical value of 51.7 grams.

Example X

Example VI was repeated using 41.6 parts by weight of isoamyl iodide in place of benzyl chloride and with forty parts by weight of methanol. The produce yield was 9.19 parts by weight as against a theoretical 50.8 parts by weight or 18 per cent. The 1-isoamyloxy-2,4,6-tris(hydroxymethyl)-benzene was obtained as a viscous brown syrup.

Example XI

Example VI was again repeated using 28.8 parts by weight of n-butyl bromide in place of the benzyl chloride along with forty parts by weight of methanol. The yield of 1-butyloxy-2,4,6-tris(hydroxymethyl)benzene as a viscous brown syrup was 27.85 parts by weight or 57.8% of the theoretical value of forty-eight parts by weight.

Example XII

One hundred and ninety-two parts by weight of the sodium salt of trimethylol phenol was dissolved in water and 49 parts by weight of dimethyl sulphate added. The mixture was stirred for two hours, 71 parts by weight of sodium hydroxide and 92 parts by weight of dimethyl sulphate added and stirring continued for about 12 hours.

The temperature of the mixture was then raised to boiling and extracted while hot with n-amyl alcohol. The product, trimethylol anisole, was obtained in a yield of 135 parts by weight, or a 73% of theory. All of the product was refluxed several hours with an excess of acetic anhydride. The acetic acid and excess acetic anhydride was removed by heating under vacuum. The resulting ester was washed twice with water and distilled at a temperature of 170–180° C. under a reduced pressure of 1–2 mm. of mercury to yield purified tri-(acetoxymethyl)anisole.

While ethers of 2,4,6-tris(hydroxymethyl)phenols have been found to be very useful for various applications, they are rather expensive to produce in the pure state because of the separation process. It has been found that for many applications and uses the ethers of the tris(hydroxymethyl) phenols can tolerate certain amounts of the ethers of 2-(hydroxymethyl(phenol, 4-hydroxymethyl)phenol, 2,6-bis(hydroxymethyl)-phenol and 2,4-bis(hydroxymethyl)phenol. It has been further found that the presence of the ethers of the uni- and bis-compounds does not detract appreciably from the beneficial results obtained. The ether of the tris-compound may be present in varying amounts but is preferably present in a major proportion of more than fifty per cent, by weight. In general, if at least 2.5 mols of formaldehyde are used to each mol of phenol, the major proportion of the reaction product will be the tris(hydroxymethyl compound. Consequently, the corresponding ether mixture will predominate in the ether of the tris-(hydroxymethyl)phenol. The formula of such mixtures may be represented as follows:

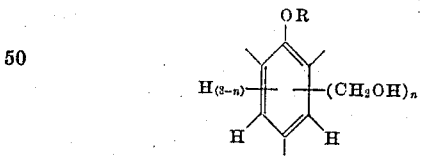

where R has the meaning given above and represents a member of the class consisting of aliphatic, cycloaliphatic, and aryl-substituted aliphatic groups including their halogen-substituted derivatives, and n is an integer and is at least one but not more than three, and in which the compound in which n is equal to three is preferably though not essentially in the major proportion.

Examples illustrating the production of such mixtures of methylol phenol ethers are as follows; where all parts are by weight.

Example XIII

Formalin in the amount of 980 parts (12 mols) of a 37.5% solution of formaldehyde was added to 376 parts phenol and mixed thoroughly. A solution of 176 parts sodium hydroxide in 200 parts water was added slowly to the mixture with cooling. The reaction mixture was then placed in an oven at 40° C. for fifteen to twenty hours. Analysis showed that 95.6 per cent of the formaldehyde had reacted. The above phenate solution was placed in a flask equipped with a stirrer. To the solution was added 326.5 parts allyl chloride and the whole stirred vigorously and heated at 60° C. for about two hours. The etherification reaction ran to about ninety-five per cent of completion.

*Example XIV*

Three hundred and fifty parts phenol and 900 parts 37.3% aqueous formaldehyde were mixed with stirring. To the solution was added 164 parts sodium hydroxide in 170 parts water and the whole reacted for six and one-half hours at 40° C. Analysis showed that 86.6 per cent of the formaldehyde had reacted to give about sixty per cent sodium tris (hydroxymethyl)-phenate along with the uni- and bis(hydroxymethyl)-phenates. Three hundred and three parts allyl chloride was added and the mixture reacted in a pressure reactor at 60° C. for three hours with vigorous stirring. Analysis showed that 98.7 per cent of the allyl chloride reacted. The aqueous layer was drawn off and the organic layer dehydrated by heating under a vacuum. The yield was 650 parts of the allyl ethers of the mixed uni-, bis- and tris(hydroxymethyl)phenols with the tris compound being present as the major component.

*Example XV*

Three hundred and thirty-two parts phenol (96% pure) and 835 parts a 36.4% aqueous solution of formaldehyde and 160 parts sodium hydroxide in 167 parts water were mixed and reacted for seven and one-half hours at 40° C. at which time 83.5 per cent of the formaldehyde had reacted to give a major proportion of sodium tris(hydroxymethyl)phenate as the product. Allyl chloride in the amount of 273 parts was added and the whole mass heated to 60° C. in an air-tight reactor for three and one-half hours with vigorous stirring. At the end of this period 93.1 per cent of the allyl chloride had reacted. The isolated organic layer was dehydrated to yield 625 parts of the allyl ether of mixed uni-, bis-, and tris(hydroxymethyl)phenol with the tris compound as the major component as a brown somewhat viscous oil.

The ethers of the trimethylol phenols are then in turn used to produce the claimed ether esters which correspond to the following general formula:

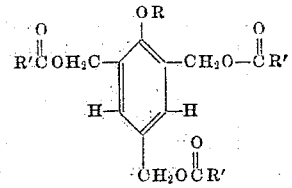

where R represents a member of the class consisting of aliphatic, cycloaliphatic and aryl-substituted aliphatic groups including their halogen-substituted derivatives, and R' represents a member of the class consisting of aliphatic, cycloaliphatic, aliphatic-substituted aryl (i. g., tolyl, xylyl, ethylphenyl, etc.), aryl (e. g., phenyl, naphthyl, anthracyl, etc.) and aryl-substituted aliphatic groups including the aromatic nuclearly halogen-substituted derivatives of the aforesaid aryl and aryl-substituted groups. The ether-esters are most conveniently produced by refluxing the methylol phenyl ether with the appropriate acid-engendering agent selected from the class consisting of chemical compounds represented by the general formulas $$R'\overset{O}{\underset{\|}{C}}-X \quad \text{and} \quad (R'\overset{O}{\underset{\|}{C}})_2O$$

where R' has the meaning given above and represents a halogen, e. g., chlorine, bromine, fluorine, etc., for instance, acid anhydride (e. g., saturated aliphatic acids, for instance, acetic anhydride, propionic anhydride, butyric anhydride, etc.) or the appropriate acid in the presence of an anhydride of a lower boiling acid as is shown in the following examples where all parts are by weight.

*Example XVI*

Propionic anhydride in the amount of 370 parts was heated with stirring to reflux. To this was added over a period of about two hours 150 parts 1-allyloxy - 2,4,6 - tris(hydroxymethyl)benzene. After all of the ether had been added, the reaction mixture was stirred and refluxed an additional fifteen minutes. The mixture was then heated under vacuum to remove propionic acid and excess propionic anhydride. The resultant ether-ester, 1-allyloxy - 2,4,6-tris(propionoxymethyl)-benzene, was a light tan liquid with a viscosity of 34.2 centipoises at 25° C. Samples of product from two different reactions had a saponification equivalent of 134 as compared with a theoretical value of 130⅔.

*Example XVII*

Fifteen parts 1-benzyloxy 2,4,6-tris(hydroxymethyl) benzene was stirred and refluxed with 103 parts propionic anhydride for about thirty minutes. The propionic acid and excess propionic anhydride were distilled off under vacuum. The ether-ester product, 1-benzyloxy-2,4,6-tris(propionoxymethyl)benzene, was a tan liquid.

*Example XVIII*

Fifteen parts 1-benzyloxy 2,4,6-tris(hydroxyl) benzene was stirred and refluxed with 109 acetic anhydride for about thirty minutes. The acetic acid formed and the excess acetic anhydride were distilled off under a vacuum. The resultant ester, 1 - benzyloxy-2,4,6-tris(acetoxymethyl) benzene, was a tan colored, somewhat viscous liquid.

*Example XIX*

Fifty parts sodium 2,4,6-tris(hydroxymethyl) phenate, twenty-seven parts ethyl bromide and 120 parts methanol were mixed and heated at 80° C. under pressure until the salt had dissolved. The methanol was distilled off at an absolute pressure of about 20 mm. of mercury. The clear light brown viscous ether product 1-ethoxy-2,4,6-tris (hydroxymethyl)benzene, was refluxed for four and one-half hours with eighty parts by weight of acetic anhydride. The formed acetic acid and the excess acetic anhydride were distilled off under a vacuum. After filtering to remove residual sodium bromide a light brown syrupy ether-ester, 1 - ethoxy-2,4,6-tris(acetoxymethyl)benzene, remained.

*Example XX*

Fifty parts sodium 2,4,6-tris(hydroxymethyl) phenate, 17.8 parts allyl chloride and 120 parts methanol were sealed in a container and heated at about 70° C. for about seventy hours. The resultant ether, 1-allyloxy-2,4,6-tris(hydroxymethyl)benzene, obtained after filtering off the salt and distilling off the methanol was a viscous oily liquid. The ether product was heated with stirring for about two hours with sixty-nine parts butyric acid and ninety parts acetic anhydride. The excess reagents were slowly distilled off. Two of the ether-ester samples had saponification equivalents of 144.3 and 145 as compared to a theoretical 144.67 for 1-allyloxy-2,4,6-tris(butyroxymethyl)benzene.

The ether-esters described above may be used as plasticizers for various resins including resins such as, for example, cellulose ethers (e. g., ethyl cellulose, methyl cellulose, etc.), cellulose esters (e. g., cellulose acetate, cellulose propionate, cellulose acetate butyrate, etc.), vinyl halide resins (e. g., polyvinyl chloride, copolymers of vinyl halides and vinyl esters as, for instance, copolymers of vinyl chloride and vinyl acetate, etc.), polyvinyl acetals so designated generically as, for instance, resins obtained by partial hydrolysis of polyvinyl acetate and subsequent reaction of the hydroxyl groups of the hydrolyzed product with various aldehydes as, for example, formaldehyde (to give polyvinyl formals), acetaldehyde (to give polyvinyl acetals), butyraldehyde (to give polyvinyl butyrals), as well as other aldehydes.

The amount of the ether-esters used as plasticizers for the foregoing class of resins may be varied within wide limits without departing from the scope of the invention. On a weight basis, the amount of ether-ester employed may vary, for example, from about 10 to as high as 70 to 80% of the total weight of the ether-ester and the aforementioned resins. Generally I prefer to use from 25 to 65%, by weight, of the ether-ester based on the total weight of the latter and the resin. If desired and where necessary the ether-ester and resin may be dissolved in a suitable solvent in order to blend the materials together prior to further processing. The following examples illustrate the use of ether-esters as plasticizers with the various resins. All parts are by weight.

About three parts 1-benzyloxy-2,4,6-tris(propionoxymethyl)benzene, four and one-half parts ethyl cellulose and nine parts toluene were milled together on rolls heated to 110° C. to 130° C. until the toluene had evaporated. A clear, very pale straw colored sheet resulted. The molded product was clear and tough and much more flexible than the unmodified ethyl cellulose.

Three parts 1-benzyloxy-2,4,6-tris(propionoxymethyl)benzene, four and one-half parts polyvinyl butyral and nine parts acetone were milled on a set of rolls heated to 110° C. to 130° C. until the acetone had evaporated. A clear, homogeneous mix formed very readily. The plasticized resin was a light brown color and was unusually tough and flexible.

Two parts 1-methoxy-2,4,6-tris(acetoxymethyl)benzene, two parts cellulose acetate and four parts acetone were milled for several minutes on cold rolls. The temperature was then raised to evaporate the acetone. A clear, flexible, well plasticized sheet resulted. When the plasticized resin was molded, flashing of the excess resin from the mold occurred at 135° C. The resultant article was clear, tough and flexible and reflected the beneficial plasticizing action of the ether ester.

Forty parts 1-allyloxy-2,4,6-tris(propionoxymethyl)benzene, sixty parts polyvinyl chloride and five parts basic lead carbonate were sheeted on heated rolls, a clear sheet forming very readily. The plasticized resin was then molded at 150° to 160° C. into a sheet about six inches square and 0.075 inch thick. The brittle point of the resin as tested on a Goodrich brittleness tester was −19° C. The volume resistivity of the resin was $0.15 \times 10^{12}$ ohms/cm³. The tensile strength was 2370 p. s. i. with an elongation of 312 per cent at the breaking point. The hardness was 87 on the Shore "A" scale.

Three parts 1-allyloxy-2,4,6-tris(propionoxymethyl)benzene and four and one-half parts polyvinyl chloride were formed into a sheet on rolls heated to 110° C. to 130° C. The resin was readily plasticized by the ester. When molded, the excess material flashed from the mold at about 132° C., the molded piece being a clear, straw color product of satisfactory increased flexibility and good toughness.

Three parts 1-allyloxy-2,4,6-tris(propionoxymethyl)benzene and four and one-half parts polyvinyl butyral were sheeted on a set of rolls heated to 110° C. to 130° C. The ester plasticized the resin readily. During molding of the resin, excess material flashed from the mold at about 90° C. The molded product was very pliable, and was a clear amber color.

Three parts 1-allyloxy-2,4,6-tris(propionoxymethyl)benzene, four and one-half parts ethyl cellulose and four parts toluene were milled on rolls heated to 110° C. to 130° C. until the toluene had evaporated. Plasticization took place quite readily. When molded, the excess material flashed from the mold at 160° C. The molded part was hard, tough and a light tan color.

Three parts 1-allyloxy-2,4,6-tris(propionoxymethyl)benzene, four and one-half parts polyvinyl formal and five parts ethylene dichloride were milled on rolls heated to 110°–130° C. until the ethylene dichloride had evaporated. The plasticized resin when molded, flashed at about 100° C. and produced a clear straw colored piece which was hard and unusually tough.

As in the case of the ethers of tris(hydroxymethyl)phenols it has been found that the more economical ether-ester mixtures which contain minor or major proportions of ether-esters of the uni- and bis(hydroxymethyl)phenols are also very useful as plasticizers. These ether-esters may be prepared from the ether of the hydroxymethylphenol and may be represented by the following general formula

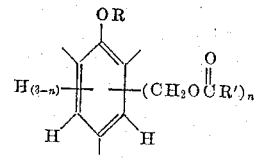

where R and R' have the meanings given above and $n$ is an integer of not more than 3 and in which the compound in which $n$ is equal to three is preferably though not essentially in a major proportion.

*Example XXI*

About 210 parts by weight of a mixture containing 1-allyloxy-2-(hydroxymethyl)benzene, 1-allyloxy-4(hydroxymethyl)benzene, 1-allyloxy-2,4-bis(hydroxymethyl)benzene, 1-allyloxy-2,6-bis(hydroxymethyl)benzene and 1-allyloxy-2,4,6-tris(hydroxymethyl)benzene wherein the tris compound was present as the major component was refluxed for about one hour with about 410 parts by weight of propionic anhydride. The excess propionic anhydride and propionic acid were distilled off under a vacuum. The filtered ether-ester was a mobile liquid and was a mixture of 1-allyloxy-2(propionoxymethyl)benzene, 1-allyloxy-4-(propionoxymethyl)benzene, 1-allyloxy-2,4-bis(propionoxymethyl)benzene, 1-allyloxy-2,6-bis(propionoxymethyl)benzene, 1-allyloxy-2,4,6-tris(propionoxymethyl)benzene wherein the tris compound is present as the major component.

As will be evident from the illustrations below the ester products made from mixed ethers in which the tris(hydroxymethyl) derivative is present in major proportion have great potentialities for use as plasticizers.

Four parts by weight of the propionate esters of a mixture of 1-allyloxy-2(hydroxymethyl) benzene, 1-allyloxy-4(hydroxymethyl)benzene, 1-allyloxy-2,4-bis(hydroxymethyl)benzene, 1-allyloxy-2,6-bis(hydroxymethyl)benzene and 1-allyloxy-2,4,6-tris(hydroxymethyl)benzene with the last in major proportion, six parts by weight of cellulose nitrate resin and eight parts by weight of acetone was mixed thoroughly and allowed to stand for about fifteen minutes. The ester milled readily into the cellulose nitrate resin, was very compatible, and imparted improved flexibility.

Four parts by weight of a mixture of 1-methoxy-2-(acetoxymethyl)benzene, 1 - methoxy-4(acetoxymethyl)benzene, 1-methoxy-2,4-bis-(acetoxymethyl)benzene, 1 - methoxy-2,6-bis-(acetoxymethyl)benzene and 1-methoxy-2,4,6-tris(acetoxymethyl)benzene with the last present in the amount of over fifty per cent, twelve parts by weight of cellulose acetate and eight parts by weight of acetone were thoroughly mixed and allowed to stand overnight. The mix was milled on differential rolls. When the acetone had evaporated and a smooth sheet formed, four additional parts by weight of plasticizer was added while the milling was continued. The plasticized resin was readily molded whereas the unplasticized resin could not be molded.

Another useful class of compounds can be made as follows:

Forty parts by weight of a mixture of 1-allyloxy-2-(butyroxymethyl)benzene, 1-allyloxy-4-(butyroxymethyl)benzene, 1-allyloxy-2,4-bis(butyroxymethyl)benzene, 1-allyloxy-2,6-bis(butyroxymethyl)benzene, and 1-allyloxy-2,4,6-tris(butyroxymethyl)benzene, the last being over fifty weight per cent of the mixture, sixty parts by weight of polyvinyl chloride and five parts by weight of lead silicate stabilizer was milled on heated rolls. The sheet was molded into a sheet six inches square and about 0.075 inch thick. The brittle point of the resin was $-20°$ C. and the volume resistivity $0.2 \times 10^{12}$ ohms per centimeter cube. The tensile strength was 2045 pounds per square inch, while elongation at the break was 263 per cent. The plasticized sheet was very flexible.

It will of course be apparent that many of the other ether-esters or mixtures of ether-esters in which the tri-substituted may be present from minor proportions to major proportions, e. g., from 10 to 75 per cent, by weight, or higher, based on the weight of the mixture of the ether-esters may also be employed without departing from the scope of the invention.

What I claim as new and desire to secure by Letters Patent of the United States is:

1. A composition of matter comprising a compound represented by the general formula

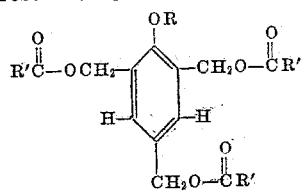

where R represents a member of the hydrocarbon class consisting of aliphatic, cycloaliphatic, aryl-substituted aliphatic groups, and halogen-substituted derivatives thereof; and R' represents a member of the hydrocarbon class consisting of aliphatic, cycloaliphatic, aliphatic-substituted aryl, aryl, aryl-substituted aliphatic groups and nuclear halogen-substituted derivatives of the aforesaid aryl and aryl-substituted groups.

2. A composition of matter as in claim 1 where R is the allyl group.

3. A composition of matter as in claim 1 where R is the benzyl group.

4. A composition of matter as in claim 1 where R is the methyl group.

5. A composition of matter comprising a mixture of ingredients including (1) a compound having the general formula

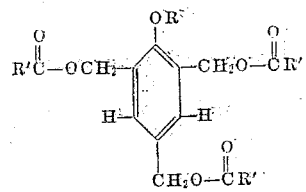

where R represents a member selected from the hydrocarbon class consisting of aliphatic, cycloaliphatic, aryl-substituted aliphatic groups, and halogen-substituted derivatives thereof; and R' represents a member of the hydrocarbon class consisting of aliphatic, cycloaliphatic, aliphatic-substituted aryl, aryl, aryl-substituted aliphatic groups, and nuclear halogen-substituted derivatives of the aforesaid aryl and aryl-substituted groups, and (2) compounds represented by the general formula

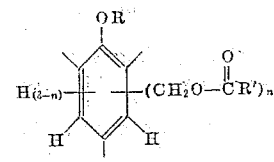

where R and R' have the meanings given above and $n$ is an integer equal to from 1 to 2, inclusive.

6. 1-benzyloxy-2,4,6-tris(acetoxymethyl) benzene.

7. 1 - allyloxy - 2,4,6 - tris(propionoxymethyl)-benzene.

8. A composition of matter comprising a mixture of ingredients comprising (1) 1-allyloxy-2,4,6-tris(acetoxymethyl)benzene and (2) compounds having the general formula

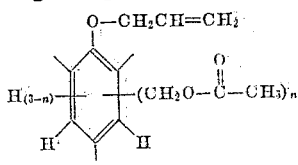

where $n$ is an integer equal to from 1 to 2, inclusive.

9. A composition comprising a material selected from the class consisting of cellulose ethers, cellulose esters, vinyl halide resins, and polyvinyl acetal resins, the said material modified with a compound corresponding to the general formula

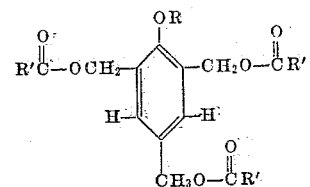

where R represents a member of the hydrocarbon class consisting of aliphatic, cycloaliphatic, aryl-substituted aliphatic groups, and halogen-substituted derivatives thereof, and R' represents a member of the hydrocarbon class consisting of aliphatic, cycloaliphatic, aliphatic-substituted aryl, aryl, aryl-substituted aliphatic groups, and nuclear halogen-substituted derivatives of the aforesaid aryl and aryl-substituted groups.

10. A composition comprising a material selected from the class consisting of cellulose ethers, cellulose esters, vinyl halide resins, and polyvinyl acetal resins, the said material modified with a mixture of compounds comprising (1) a compound corresponding to the general formula

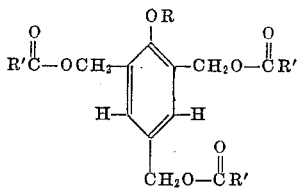

where R represents a member of the hydrocarbon class consisting of aliphatic, cycloaliphatic, aryl-substituted aliphatic groups, and halogen-substituted derivatives thereof, and R' represents a member selected from the hydrocarbon class consisting of aliphatic, cycloaliphatic, aliphatic-substituted aryl, aryl, aryl-substituted aliphatic groups, and nuclear halogen-substituted derivatives of the aforesaid aryl and aryl-substituted groups and (2) compounds represented by the general formula

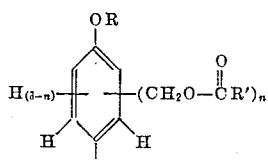

where R and R' have the meaning given above and $n$ is an integer equal to from 1 to 2, inclusive.

11. A composition of matter comprising ethyl cellulose modified with a composition comprising 1-benzyloxy-2,4,6-tris(propionoxymethyl)-benzene.

12. A composition of matter comprising polyvinyl butyral resin modified with a composition comprising 1-allyloxy-2,4,6-tris(propionoxymethyl)benzene.

13. A composition of matter comprising polyvinyl chloride modified with a composition comprising 1-allyoxy-2,4,6-tris(propionoxymethyl)-benzene.

14. The method of preparing chemical compounds selected from the class consisting of (1) compounds represented by the general formula

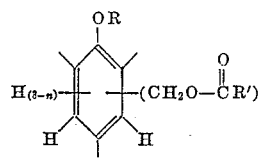

where $n$ is 3, R represents a member of the hydrocarbon class consisting of aliphatic, cycloaliphatic, aryl-substituted aliphatic groups, and halogen-substituted derivatives thereof, and R' represents a member of the hydrocarbon class consisting of aliphatic, cycloaliphatic, aliphatic-substituted aryl, aryl, aryl-substituted aliphatic groups, and nuclear halogen-substituted derivatives of the aforesaid aryl and aryl-substituted groups, and (2) mixtures of a substantial amount of the compounds of (1) with compounds represented by the general formula of (1) where $n$ is an integer equal to from 1 and 2, which process comprises heating a mixture of ingredients comprising essentially (A) a compound selected from the class consisting of (a) compounds represented by the general formula

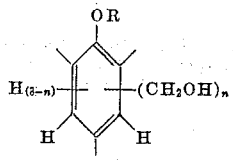

where $n$ is 3 and R and R' having the meaning given above and (b) mixtures of a substantial amount of the compounds of (a) with compounds represented by the general formula (a) where $n$ is an integer equal to from 1 and 2, and (B) an acid-engendering agent selected from the class consisting of chemical compounds represented by the general formulas

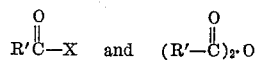

where R' has the meaning given above and X represents a halogen.

15. The method of preparing chemical compounds selected from the class consisting of (1) compounds represented by the general formula

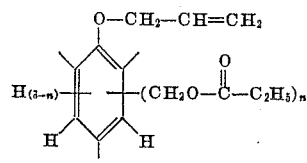

where $n$ is 3 and (2) mixtures of a substantial amount of the compound of (1) with compounds represented by the general formula of (1) where $n$ is an integer equal to from 1 and 2, which process comprises heating a mixture of ingredients comprising essentially (A) a compound selected from the class consisting of (a) compounds represented by the general formula

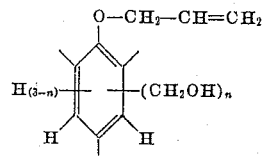

where $n$ is 3 and (b) mixtures of a substantial amount of the compound of (a) with compounds represented by the general formula (a) where $n$ is an integer equal from 1 and 2, and (B) propionic anhydride.

16. The method of preparing chemical compounds selected from the class consisting of (1) compounds represented by the general formula

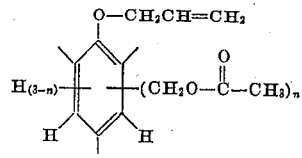

where $n$ is 3 and (2) mixtures of a substantial amount of the compound of (1) with compounds represented by the general formula of (1) where $n$ is an integer equal to from 1 and 2, inclusive, which process comprises heating a mixture of ingredients comprising (A) chemical compounds selected from the class consisting of (a) compounds represented by the general formula

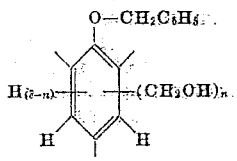

where $n$ is 3 and (b) mixtures of a substantial amount of the compound of (a) with compounds represented by the general formula of (a) where $n$ is an integer equal to from 1 and 2, inclusive, and (B) acetic anhydride.

ROBERT W. MARTIN.

REFERENCES CITED

The following references are of record in the file of this patent:

UNITED STATES PATENTS

| Number | Name | Date |
|---|---|---|
| 2,265,141 | Bruson | Dec. 9, 1941 |